(12) United States Patent
Gomes et al.

(10) Patent No.: US 9,493,853 B2
(45) Date of Patent: Nov. 15, 2016

(54) CLEANING TOOL FOR CLEANING PARTICLES CONTAINED IN A SLURRY

(71) Applicants: Guilherme Santana Lopes Gomes, Belo Horizonte (BR); Victor Loureiro Dos Santos, Belo Horizonte (BR)

(72) Inventors: Guilherme Santana Lopes Gomes, Belo Horizonte (BR); Victor Loureiro Dos Santos, Belo Horizonte (BR)

( * ) Notice: Subject to any disclaimer, the term of this patent is extended or adjusted under 35 U.S.C. 154(b) by 473 days.

(21) Appl. No.: 14/034,050

(22) Filed: Sep. 23, 2013

(65) Prior Publication Data

US 2014/0023559 A1    Jan. 23, 2014

Related U.S. Application Data

(62) Division of application No. 12/984,409, filed on Jan. 4, 2011, now Pat. No. 8,540,798.

(51) Int. Cl.

| | | |
|---|---|---|
| *C21B 3/04* | (2006.01) | |
| *C21C 5/38* | (2006.01) | |
| *C21C 5/40* | (2006.01) | |
| *C22B 1/14* | (2006.01) | |
| *C22B 1/20* | (2006.01) | |
| *C22B 1/24* | (2006.01) | |
| *C22B 1/243* | (2006.01) | |
| *C22B 1/244* | (2006.01) | |

(Continued)

(52) U.S. Cl.
CPC . *C21B 3/04* (2013.01); *C21C 5/38* (2013.01); *C21C 5/40* (2013.01); *C22B 1/14* (2013.01); *C22B 1/20* (2013.01); *C22B 1/243* (2013.01); *C22B 1/244* (2013.01); *C22B 1/2406* (2013.01); *C22B 7/005* (2013.01); *C22B 7/02* (2013.01); *Y02P 10/216* (2015.11); *Y02P 10/283* (2015.11)

(58) Field of Classification Search
CPC ............. C21B 3/04; C21C 5/38; C21C 5/40; C22B 1/14; C22B 1/20; C22B 1/2406; C22B 1/244; C22B 7/005; C22B 7/02; C22B 1/243; Y02P 10/216; Y02P 10/283
See application file for complete search history.

(56) References Cited

U.S. PATENT DOCUMENTS

| 2,235,835 A | 3/1941 | Goetzel |
|---|---|---|
| 3,278,293 A | 10/1966 | Smith |

(Continued)

FOREIGN PATENT DOCUMENTS

| JP | 52082616 | 7/1977 |
|---|---|---|
| JP | 57019229 | 2/1982 |

(Continued)

OTHER PUBLICATIONS

International Search Report and Written Opinion dated Aug. 27, 2012, issued in connection with related PCT/IB2011/003182 filed Dec. 30, 2011.

(Continued)

*Primary Examiner* — Walter D Griffin
*Assistant Examiner* — Cameron J Allen
(74) *Attorney, Agent, or Firm* — Downs Rachlin Martin PLLC

(57) ABSTRACT

A cleaning tool that includes an acoustic cavitation duct that cleans particles within a continuous flow of slurry. In one embodiment, the acoustic cavitation duct includes an elongated fluid passageway for carrying the flow of slurry. A number of ultrasonic transducers are spaced from one another along the length of the passageway and induce cavitation into the slurry as it travels through the duct. The cavitation promotes the cleaning of the slurry particles. In one example, the transducers operate at differing frequencies.

17 Claims, 6 Drawing Sheets

(51) Int. Cl.
*C22B 7/00* (2006.01)
*C22B 7/02* (2006.01)

(56) References Cited

U.S. PATENT DOCUMENTS

| | | | |
|---|---|---|---|
| 5,035,363 | A | 7/1991 | Somoza |
| 5,785,737 | A | 7/1998 | Lynn et al. |
| 5,885,322 | A | 3/1999 | Sarma et al. |
| 7,322,431 | B2 * | 1/2008 | Ratcliff .................. B01D 17/00 166/177.1 |
| 2007/0163388 | A1 | 7/2007 | Sada |
| 2008/0156709 | A1 | 7/2008 | Johnson |
| 2011/0024361 | A1 * | 2/2011 | Schwartzel ............. C02F 1/325 210/739 |
| 2011/0072935 | A1 | 3/2011 | Gillis |
| 2012/0325727 | A1 * | 12/2012 | Dionne .................... B03B 5/00 209/155 |

FOREIGN PATENT DOCUMENTS

| | | |
|---|---|---|
| JP | 61087827 | 5/1986 |
| JP | 2000063806 | 2/2000 |
| JP | 2000239752 | 9/2000 |
| JP | 2003105414 | 4/2003 |
| JP | 2005081247 | 3/2005 |
| JP | 2005111394 | 4/2005 |
| JP | 2010261101 | 11/2010 |
| JP | 2010277987 | 12/2010 |
| WO | 2005017216 A2 | 2/2005 |
| WO | 2005017217 A1 | 2/2005 |

OTHER PUBLICATIONS

First Office Action dated Oct. 3, 2012, issued in connection with related U.S. Appl. No. 12/984,409, filed Jan. 4, 2011.
Brinck et al. Derwent Acc No. 1997-550305 for Patent Publication BR 9504197 A published Sep. 9, 1997. Abstract.
Response to First Office Action dated Feb. 4, 2013, filed in connection with related U.S. Appl. No. 12/984,409, filed Jan. 4, 2011.
Final Office Action dated Feb. 28, 2013, issued in connection with related U.S. Appl. No. 12/984,409, filed Jan. 4, 2011.
Response to Final Office Action dated May 8, 2013, filed in connection with related U.S. Appl. No. 12/984,409, filed Jan. 4, 2011.
Notice of Allowance dated May 24, 2013, issued in connection with related U.S. Appl. No. 12/984,409, filed Jan. 4, 2011.

* cited by examiner

CLEANING TOOL FOR CLEANING PARTICLES CONTAINED IN A SLURRY

RELATED APPLICATION DATA

This application is a divisional of U.S. patent application Ser. No. 12/984,409, filed on Jan. 4, 2011, and titled "SYSTEMS AND METHODS FOR RECYCLING STEELMAKING CONVERTER SLUDGE" (now U.S. Pat. No. 8,540,798), which is incorporated herein in its entirety.

FIELD OF THE INVENTION

The present invention generally relates to the field of steelmaking. In particular, the present invention is directed to a cleaning tool for cleaning particles contained in a slurry.

BACKGROUND

During the process of making steel, many residues are produced. Among these residues is sludge from basic oxygen converters. In converter-based steelmaking, high-velocity oxygen is injected into a basic oxygen converter, which is typically charged with molten pig iron, scrap metals, lime, and iron ore, in order to remove carbon and silicon from the charge and to form molten steel. This process produces a large volume of hot fumes that contain fine particles of the charge materials and carbon monoxide gas. To avoid polluting the environment, the hot fumes are scrubbed before being discharged into the environment. Typically, the fumes are quenched with water and cleaned of suspended metal particles and other solids. The remaining gas (carbon monoxide) is drawn off and is often used as fuel in the steelmaking process. The solids and the quenching water form a sludge that is collected, typically in a settling tank. This residue sludge, which comprises metallic iron particles and other solids, is generally separated into "thick" and "thin" sludges. The thick sludge contains the larger solids from the fumes and is usually either discarded into landfills or dried and used as sinter feed for blast furnaces that produces pig iron.

SUMMARY OF THE DISCLOSURE

In one implementation, the present disclosure is directed to an apparatus for cleaning particles in a slurry in a continuous-flow process. The cleaning tool includes an inlet designed and configured to receive the slurry in a continuous flow; an outlet designed and configured to output the slurry in the continuous flow; and an acoustic cavitation duct extending between the inlet and the outlet so as to carry the slurry in the continuous flow, wherein the acoustic cavitation duct defines a fluid passageway having a flow axis and is designed and configured for inducing acoustic cavitation within the fluid passageway in the continuous flow of the slurry along the flow axis.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

As described in the Background section above, a byproduct of steelmaking processes that utilizes basic oxygen converters, such as Linz-Donawitz (LD) converters, is a converter sludge that contains metallic iron particles and other solids, including non-metallic-iron particles, such as the calcium oxide, silicon dioxide, aluminum trioxide, magnesium oxide, ferrous oxide, alkalis, and zinc. Conventionally, the larger solids in the converter sludge are isolated into a "thick converter sludge," and this thick sludge is either disposed of in landfills or used as sinter feed for making pig iron. Landfill disposal is undesirable for environmental reasons and because the metallic iron in the thick sludge is essentially wasted. In one example, the average metallic iron content of thick converter sludge is around 50%. When used as sinter feed for making pig iron, the thick converter sludge is mixed with iron ore fines and go normally through the conventional iron sintering process. When used as a briquette for direct blast furnace charge the thick converter sludge is dried, generally supplemented with binder and formed into briquettes that are then typically added to a blast furnace to make pig iron. While the metallic iron in the thick converter sludge is being recycled in this process, an undesirable result is that the large amount of the material in the sinter feed that are not metallic iron particles, such as alkalis, zinc, and the binder used to make the briquettes causes additional slag to form in the blast furnace.

Some aspects of the present invention are directed to processing converter sludge so that metallic iron particles contained in the sludge are efficiently recyclable without the drawbacks of conventional converter-sludge-based sinter feed. In one example, a very large portion of the metallic iron particles present in the converter sludge are separated from non-metallic-iron components of the sludge and then formed into coherent bodies without any binder additives or other contaminants. The result is bodies that have high mechanical resistance and high metallic iron content (e.g., greater than 80%) that can be used as feed for a basic oxygen converter and/or electric arc furnaces, essentially as a replacement for scrap iron. Exemplary embodiments of these aspects are described below in the context of several specific examples.

Figure 1:
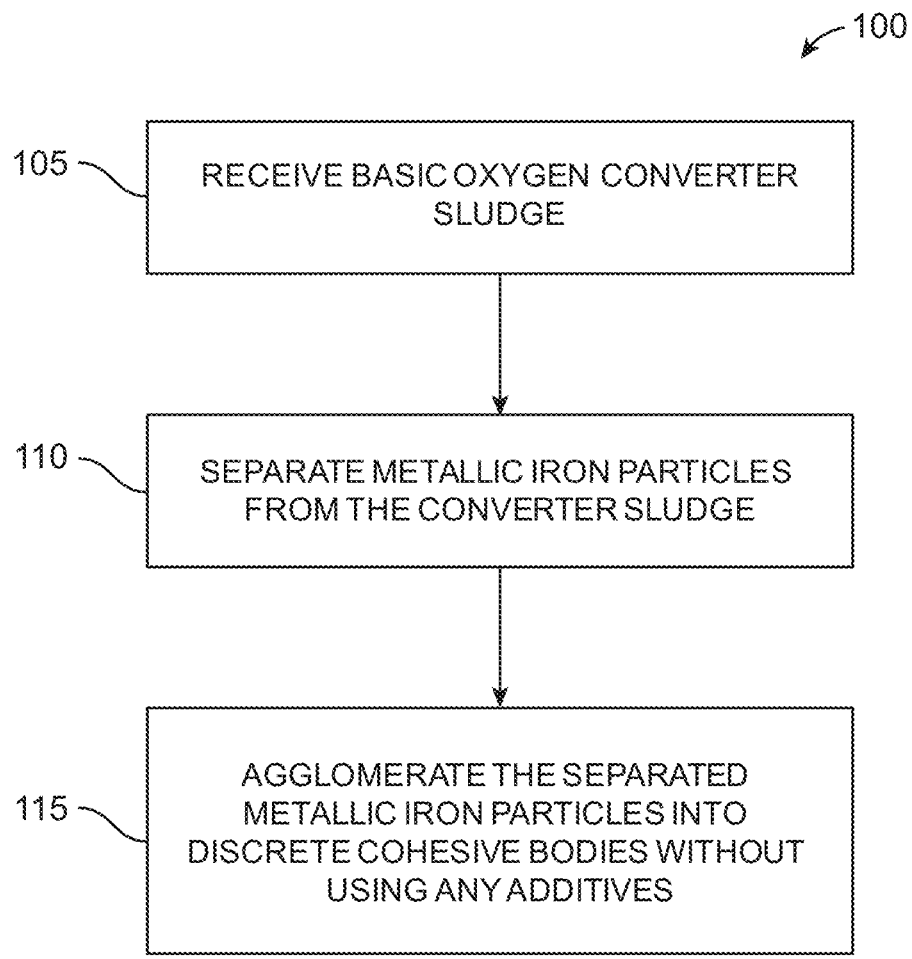
FIG. 1 is a flow diagram illustrating a method of recycling sludge produced by a fume scrubbing system of a basic oxygen converter.

Referring now to the drawings, FIG. 1 illustrates a method 100 of agglomerating metallic iron particles, present in converter sludge, into coherent bodies consisting essentially of the metallic iron of the metallic iron particles in the sludge. Those skilled in the art will readily understand that this residue sludge is created in the process of scrubbing fumes from the basic oxygen-converting process to rid the gas in the fumes of the solids that are also present in the fumes, such as the metallic iron particles and non-metallic-iron solids mentioned above.

As seen in FIG. 1, method 100 includes only a few high-level steps. However, those skilled in the art will readily appreciate that practical applications of method 100 using current technologies will typically include multiple sub-steps for effecting the higher-level steps of method 100. With that in mind, at step 105, a residue basic oxygen converter sludge is received from, for example, a fume scrubber, storage facility, or other place. At step 110, a substantial portion of the metallic iron particles within the sludge are separated from all of the non-magnetic-iron material within the sludge so that essentially all that remains is the metallic iron particles. Then, at step 115 the metallic iron particles are agglomerated with one another into discrete cohesive bodies, such as briquettes, that can be handled without substantially losing their integrity. Ideally, these cohesive bodies are created without binders or any other additives in order to keep the bodies as free from non-metallic-iron material as practicable. As mentioned above, these cohesive bodies composed essentially only of pure metallic iron from the metallic iron particles in the converter sludge can be used for any suitable purpose, such as for charging a basic oxygen converter or electric arc furnace.

Figure 2:
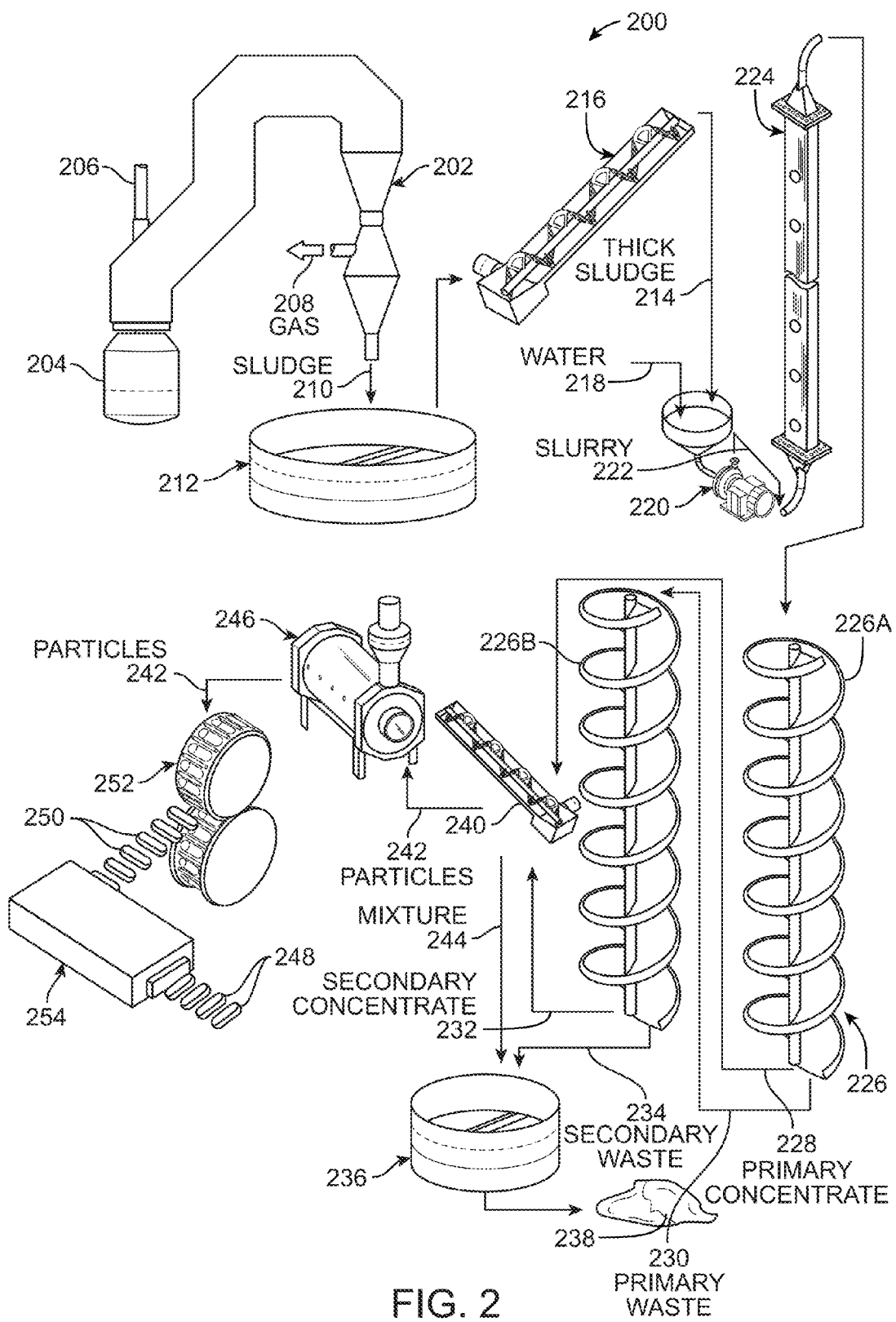
FIG. 2 is a schematic diagram of a continuous sludge processing system designed and configured to perform the method of FIG. 1.
Figure 3:
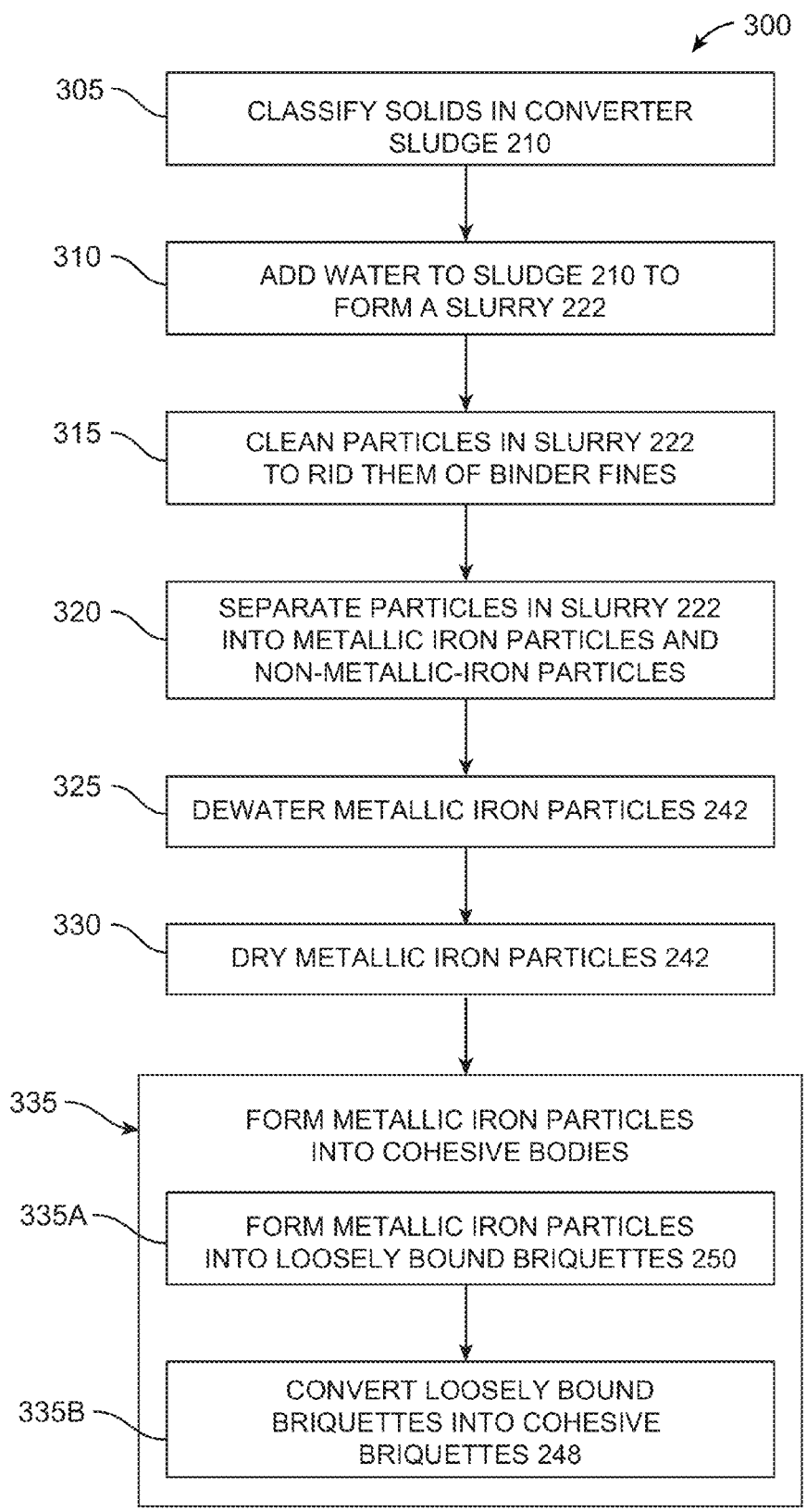
FIG. 3 is a flow diagram illustrating a specific example of a continuous-processing method of recycling basic oxygen converter sludge.

Referring now to FIGS. 2 and 3, these figures illustrate, respectively, a converter sludge processing system 200 and a corresponding method 300 of processing converter sludge using the system of FIG. 2 to form cohesive bodies composed essentially of the metallic iron of metallic iron particles originally in the sludge. For convenience of working with FIGS. 2 and 3, and occasionally other figures as well, it is noted that the first one or two digits of each element/step numeral used in this disclosure correspond to the number of the figure the reader should look at to see that element/step. For example, for elements having 200-series numerals the reader should look at FIG. 2, and for steps having 300-series numerals, the reader should look at FIG. 3.

As seen in FIG. 2, converter sludge processing system 200 in this example is located downstream of a fume scrubbing system 202 that scrubs fumes that emanate from an LD converter 204 during oxygen conversion of the charge (not shown) within the converter using a high-pressure-oxygen lance 206. As those skilled in the art understand, scrubbing system 202 cools the converter fumes and scrubs particulate matter from the fumes, typically by quenching the fumes with water (not shown). The products of such scrubbing are the gas 208 (largely carbon monoxide) originally contained in the fumes and converter sludge 210, which is a mixture of the particulate matter from the fumes with the quenching water. In this example, sludge 210 is captured in a settling tank 212.

Figure 4:
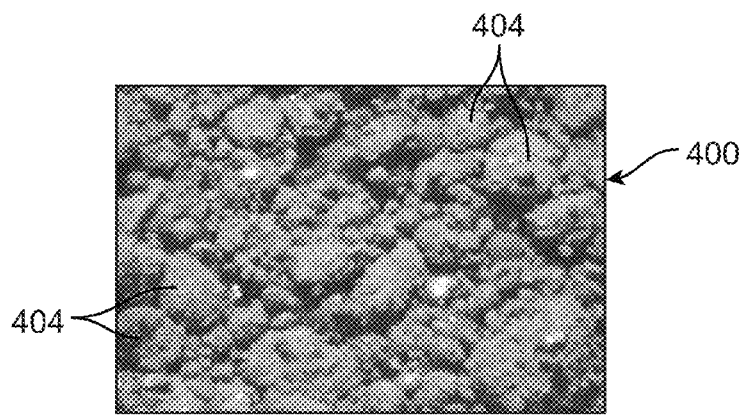
FIG. 4 is a photograph of dried thick converter sludge.

Referring to FIG. 3, and also to FIG. 2 for references to converter sludge processing system 200, at step 305 of method 300 converter sludge 210 is subjected to classification in which the sludge is separated into thick converter sludge 214 and thin converter sludge (not shown). In one example, thick converter sludge 214 is essentially composed of all of the solids in the sludge that are too large to pass through a 325-mesh sieve, i.e., have sizes greater than 44 microns. Of course, other minimum particle size cutoffs can be used as long as the desired metallic iron particles are not excluded from thick converter sludge 214. In the particular embodiment of system 200 shown, this classification is performed by an Atkins-type screw conveyor 216. However, those skilled in the art will understand that classification can be accomplished in any of a variety of ways, such as using one or more cyclones, one or more jig separators, etc. That said, Atkins-type screw conveyor 216 contributes to the continuous-flow processing nature of exemplary system 200 that is addressed in more detail below. FIG. 4 shows a sample 400 of thick converter sludge 214 that has been dried for clarity. FIG. 4 illustrates how the relatively large particles 404 in thick converter sludge 214, which include metallic iron particles (typically solid and hollow spheres) and non-metallic-iron particles (such as calcium oxide and silicon dioxide particles), are covered with binder fines that adhere to these particles.

Referring again to FIGS. 2 and 3, at step 310 water 218 is added to thick converter sludge 214, here using a conditioner/slurry pump 220, to create a slurry 222 and pump the slurry to the next stage of system 200. In one example, water 218 is added to thick converter sludge 214 so that slurry 222 is about 30% solids. Generally, a suitable slurry will have a solids percentage in a range of about 20% to about 50%. In this embodiment, conditioner/slurry pump 220 is designed and configured to produce and pump slurry 222 having 30% solids (70% water) at a rate of 0.1 $m^3$/min.

Figure 5:
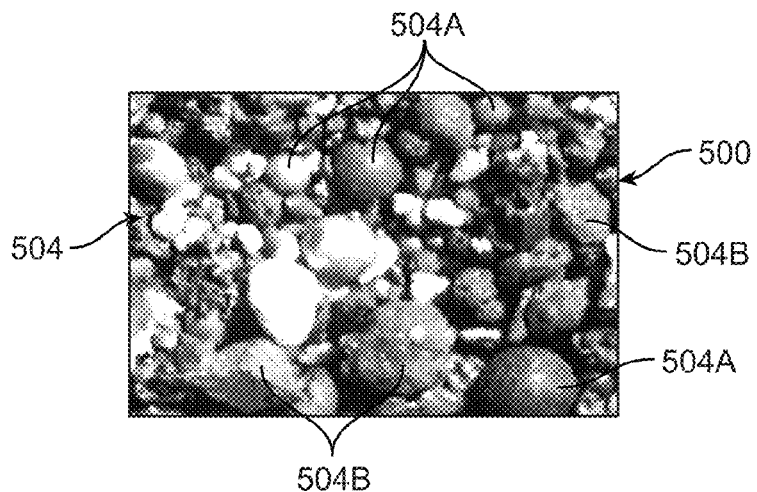
FIG. 5 is a photograph of dried particulate remnants of the thick converter sludge after cleaning, showing the remaining metallic iron particles and non-metallic-iron particles.

At step 315, the binder fines adhering to the larger particles in slurry 222 are removed from the particles. This step can be referred to as a "particle cleaning step" and can be achieved, for example, using acoustic cavitation. In the embodiment of converter sludge processing system 200 shown, particle cleaning step 315 is effected by a vertically oriented acoustic cavitation device 224 in which the particles are cleaned as slurry 222 flows upward through the device in a continuous stream. Further details of exemplary acoustic cavitation device 224 are described below in connection with FIGS. 9-11. In other embodiments, other cleaning devices can be used. FIG. 5 shows a dried sample 500 of the relatively large particles 504 from slurry 222 after particle cleaning step 315. FIG. 5 clearly shows how particle cleaning step 315 removes the binder fines that originally covered the particles in thick converter sludge 214. As also seen in FIG. 5, particles 504 include metallic iron particles 504A and non-metallic-iron particles 504B.

Again referring back to FIGS. 2 and 3, at step 320 the now-cleaned particles in slurry 222 are separated into two groups, the metallic iron particles (e.g., particles 504A in FIG. 5) and all other particles, i.e., non-metallic-iron particles (e.g., particles 504B in FIG. 5), in order to concentrate the metallic iron particles. In the embodiment of converter sludge processing system 200 shown in FIG. 2, this separation is achieved using a two-stage separator 226 having first and second spiral stages 226A, 226B in series with one another. The metallic iron particles are typically heavier than the non-metallic-iron particles, and separator 226 separates the differing particles based on their weight in a gravity separation process. In this example, first stage spiral 226A is a high-grade (HG) series spiral available from Downer EDi Mining, Carrara, Australia. First stage spiral 226A separates slurry 222 into a primary concentrate 228 and a primary waste 230. It is noted that the 30%-solids composition of slurry 222 was selected in this example because of the particular HG spiral 226A used. Here, an HG11 spiral was used, and this spiral is most effective with solids percentages in a range of about 27% to about 33%. With other spiral and other types of separators the solids content of slurry 222 can be outside this range as needed.

Primary concentrate 228 contains the heavier particles from slurry 222, which are largely the desired metallic iron particles. Primary concentrate 228 is sent off for further processing, as described below. Primary waste 230 contains lighter particles, some of which are metallic iron particles. Primary waste 230 is sent to second spiral stage 226B in order to retrieve at least some of these smaller metallic iron particles. In this embodiment, second spiral stage 226B is a medium-grade (MG) series spiral available from Downer EDi Mining and separates primary waste 230 into a secondary concentrate 232 and a secondary waste 234. The particles in secondary concentrate 232 are largely only metallic iron particles, whereas the particles in secondary waste are largely only non-metallic-iron particles. As with primary concentrate 228, secondary concentrate 232 is sent off for further processing, as described below. Secondary waste 234 is sent to a settling tank 236. After settling, these particles 238, which include calcium carbonate and silicon dioxide particles, are collected and dried and can be used, for example, in cement.

Figure 6:
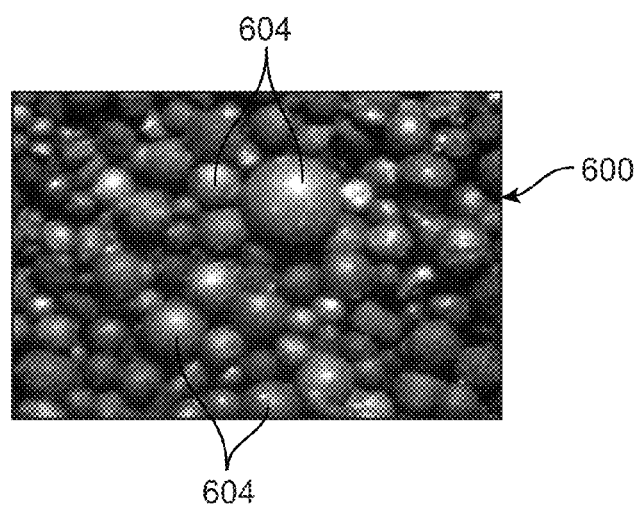
FIG. 6 is a photograph of the metallic iron particles after processing the remnant solids of the slurry cleaning step to concentrate the metallic iron particles by separating them from the non-metallic-iron particles.
Figure 7:
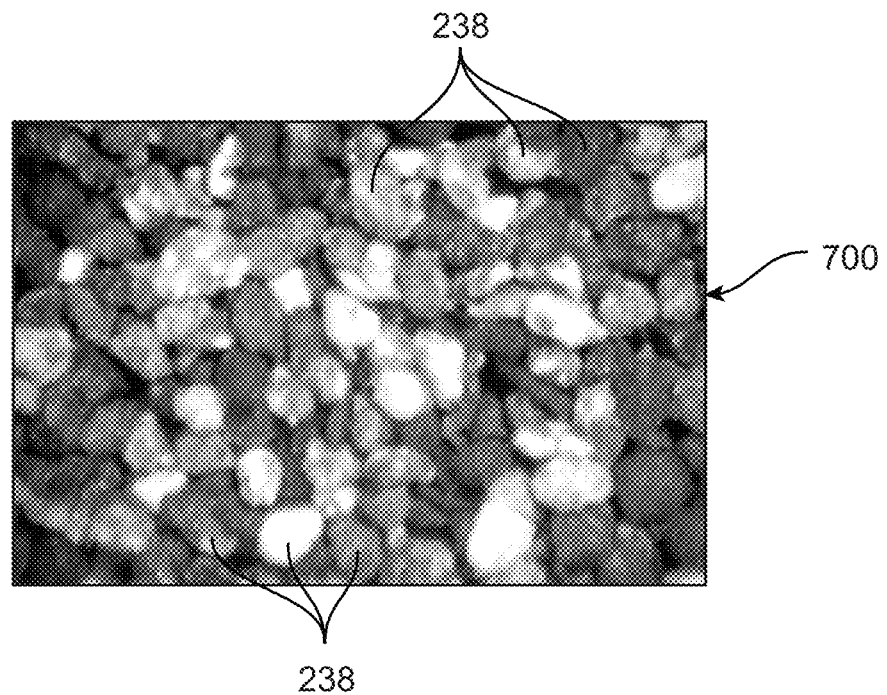
FIG. 7 is a photograph of the non-metallic-iron particles after processing the remnant solids of the slurry cleaning step to concentrate the metallic iron particles by separating them from the non-metallic-iron particles.

At the end of processing by separator 226, the combination of primary and secondary concentrates 228, 232 contains the metallic iron particles in relatively high concentration, typically at least 80%. FIG. 6 shows a dried sample 600 of particles 604 contained in the combination of primary and secondary concentrates 228, 232. As seen in FIG. 6, virtually all of particles 604 are metallic iron particles. In contrast, FIG. 7 shows a dried sample 700 of particles 238 that were in secondary waste 234 discarded to settling tank 236 after processing by separator 226. FIG. 7 clearly shows that substantially all of particles 238 are non-metallic-iron particles. Although a Humphrey's-type spiral separator 226 is used here, those skilled in the art will readily understand that the separation at step 320 can be achieved in any of a variety of other ways, such as by using a cyclone separator, a concentration table, jig separator, and electromagnet separator etc.

Referring back to FIGS. 2 and 3, at step 325 primary and secondary concentrates 228, 232, which contain a high concentration of metallic particles, are dewatered. In the embodiment shown, dewatering is achieved using a dewatering screw conveyor 240, although in other embodiments dewatering can be performed in other manners, such as using a dewatering cyclone, etc. The outputs of dewatering screw conveyor 240 are the particles 242 from primary and secondary concentrates 228, 232, which, again, are largely only metallic iron particles, and the mixture 244 of water and very fine particles from the two concentrates. In the embodiment shown, mixture 244 is sent to settling tank 236, and the water is reused in other parts of system 200, such as in condition/slurry pump 220, wherein it is used to create 30%-solids slurry 222 as described above. The flow of particles 242 output from dewatering screw conveyor 240 has a moisture content of about 20%. At step 330, particles 242 are dried in a suitable dryer 246. In one example, dryer 246 heats particles to about 200° C. to drive the water out/off of the particles.

All of the pieces of equipment that contribute to the separation/isolation of the metallic iron particles originally in converter sludge 210 can be considered, collectively, as "separating equipment" since they participate in the separation/isolation process. In exemplary converter sludge processing system 200, such separating equipment includes not only acoustic cavitation device 224, which removes fines from the particles in slurry 222, and separator 226, which concentrates the metallic iron particles in slurry 222, but also classifying screw conveyor 216, conditioner/pump 220, dewatering screw conveyor 240, and dryer 246, all of which contribute to the overall separating/isolating process.

At step 335, the now-dried particles 242 are formed into cohesive bodies, here cohesive briquettes 248, that can be handled and stored without losing their cohesiveness. In the embodiment of converter sludge processing system 200 illustrated, step 335 has two primary sub-steps 335A, 335B due to the type of equipment used. At sub-step 335A, particles 242 are formed into loosely bound briquettes 250 using a high-pressure former 252. In this embodiment, former 252 is a briquette press. As one example, former 252 can be 220-metric-ton briquette press model B220B available from K.R. Komarek, Wood Dale, Ill. Because particles are largely only metallic iron particles (typically microspheres) and no binder is used, loosely bound briquettes 250 have very low mechanical resistance and, therefore, generally cannot be handled without losing their initial integrity. Consequently, at sub-step 335B, loosely bound briquettes 250 are heat-treated in a heat treatment device 254 so as to transform the loosely bound briquettes into cohesive briquettes 248 that remain largely intact during normal handling and storage, if any. In one example, at sub-step 335B loosely bound briquettes 250 are heated to a temperature sufficiently high, typically greater than about 700° C., for a time long enough to transform them into cohesive briquettes 248 having mechanical resistance and hardness that makes it possible to handle and store them without causing them to substantially lose their original shape. In one embodiment, heat treatment device 254 is a continuous-feed furnace that complements the rest of converter sludge processing system 200, in which the primary components are continuous-feed components. In one example, heat treatment device 254 is an 8-meter-long furnace that provides a 25-minute residence time and heats loosely bound briquettes 250 at a temperature of about 850° C. to about 900° C. Under these conditions, thermal migration amongst the atoms of the interfaces of particles 242 within loosely bound briquettes 250 is promoted to a point that the particles become cohesively bound together and form cohesive briquettes 248. Energy usage can be minimized by heating loosely bound briquettes 250 only enough to enable this cohesive bonding. Of course, the particles can be heated until fusion occurs, but this requires more energy. All of the pieces of equipment that contribute to the forming of cohesive briquettes 248 can be considered, collectively, as "forming equipment." In exemplary converter sludge processing system 200, such forming equipment includes high-pressure former 252 and thermal treatment device 254.

Figure 8:
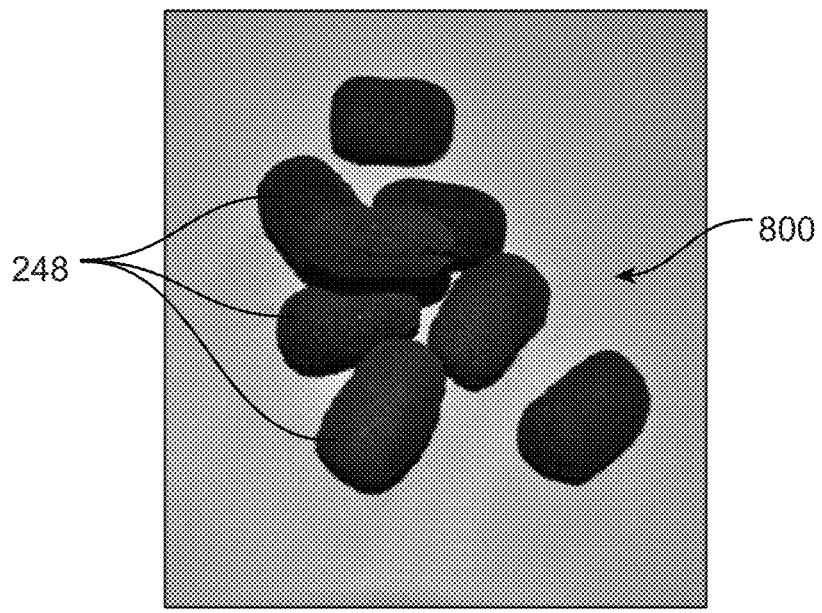
FIG. 8 is a photograph of a set of briquettes consisting essentially of only metallic iron particles recovered from basic oxygen converter sludge.

Cohesive briquettes 248 generally do not lose their cohesiveness until reaching their fusion point. FIG. 8 shows a set 800 of actual cohesive briquettes 248 made using converter sludge processing system 200, which includes the K.R. Komarek B220B briquetting press mentioned above, which produces, for example, briquettes that are 3 cm×2.5 cm×1.5 cm in size. Once cohesive briquettes 248 have been created, they can be used as desired. For example, as mentioned above cohesive briquettes can be used as charge material for a basic oxygen converter or an electric arc furnace.

As mentioned above, exemplary converter sludge processing system 200 is designed and configured so that the steps of method 300 are performed with a continuous flow through the system. That is, all primary pieces of equipment selected for this system do not process batches; rather, they process in continuous flows. For example, the example used for heat-treatment device 254 is a furnace in which loosely bound briquettes 250 are heated as they progress along the length of the furnace. As other examples, Atkins-type screw conveyor 216, Humphrey's-type spiral separator 226, and dewatering screw conveyor 240 all operate in continuous processing modes. That said, those skilled in the art will appreciate that in alternative embodiments, any one of the disclosed pieces of continuous processing mode equipment can be replaced by corresponding batch processing equipment.

In addition, those skilled in the art will readily appreciate that depending on the nature of the equipment used, two or more pieces of equipment in converter sludge processing system 200 of FIG. 2 can be replaced by a single piece of equipment that achieves the same end result as the pieces of equipment being replaced. For example, in system 200, step 335 of forming cohesive bodies of the metallic iron particles is performed using high-pressure former 252 and heat treatment device 254. However, a single piece of equipment designed and configured to heat the particles during pressure forming can replace two separate devices 252, 254. Those skilled in the art will understand where such replacements can be made.

An important component of exemplary converter sludge processing system 200 is acoustic cavitation device 224 because of the role it plays in the removals of the binder fines from the larger particles slurry 222 that allow for the production of such high purity metallic iron briquettes 248. Like other components of system 200 mentioned above, acoustic cavitation device 224 is designed and configured to process a continuous flow of slurry 222 as it flows through the device. In order to achieve this, acoustic cavitation device 224 has a unique design that is more particularly shown in FIGS. 9-11.

Figure 9:
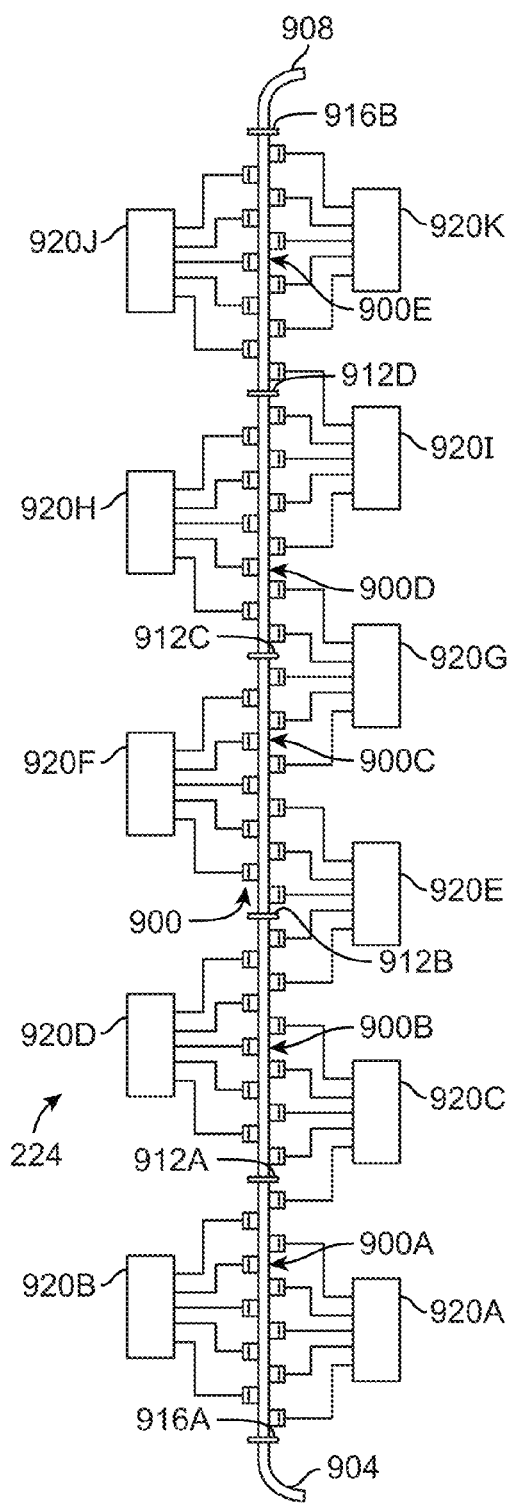
FIG. 9 is a side elevational view of the acoustic cavitation device of the converter sludge processing system of FIG. 2.

Referring now to FIG. 9, the exemplary acoustic cavitation device 224 shown is designed and configured to process an about 15%-solids slurry to an about 50%-solids slurry composed of thick converter sludge and water at the rate of 10 m³/hour. In the particular example of FIG. 2, the percentage of solids in slurry 222 is about 30%. This should be kept in mind when reading the following description of device 224 to understand that other embodiments can have different configurations, dimensions, etc., especially when designed for other processing rates.

Acoustic cavitation device 224 includes an acoustic cavitation duct 900, an inlet 904, and an outlet 908, and, when installed, the duct is oriented vertically with the inlet at the lower end and the outlet at the upper end. It is noted that it is preferred, but not absolutely necessary, that duct 900 be oriented vertically or inclined, rather than horizontally, since a horizontal orientation could cause precipitation of solids within the duct. Having inlet 904 at the lower end also helps in controlling the time that slurry 222 (FIG. 2) is exposed to the acoustic cavitation cleaning action. In this example, acoustic cavitation duct 900 is 5 meters long in the direction of flow between inlet 904 and outlet 908, and is made up of five identical 1-meter-long segments 900A-E secured to each other via flanged and bolted connections 912A-D. Inlet 904 and outlet 908 are similarly secured to acoustic cavitation duct 900 via flanged and bolted connections 916A-B. As seen best in FIGS. 10 and 11, acoustic cavitation duct 900 defines an internal passageway 1000 having a rectangular transverse cross-sectional shape of approximately 70 mm×32 mm in size.

Figure 10:
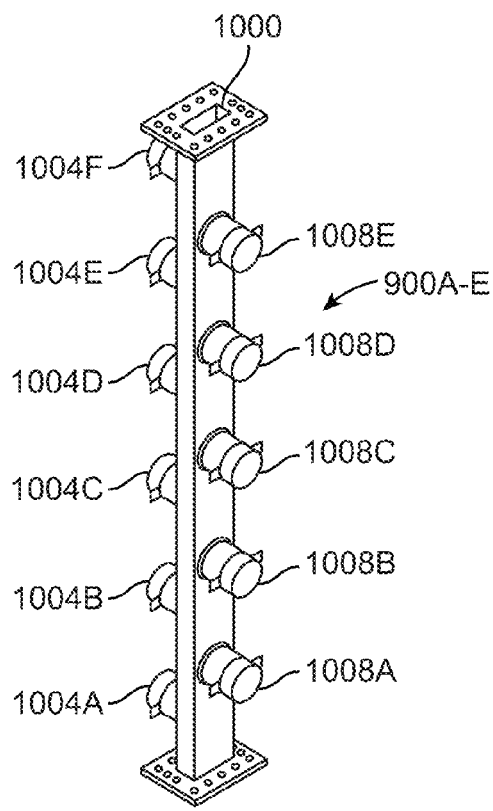
FIG. 10 is an enlarged elevational perspective view of one segment of the acoustic cavitation duct of FIG. 9.
Figure 11:
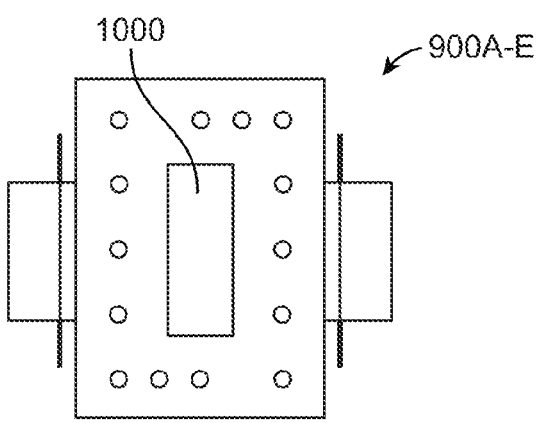
FIG. 11 is an enlarged view of one end of the acoustic cavitation duct segment of FIG. 10.

As seen in FIG. 10, each acoustic cavitation duct segment 900A-E includes eleven ultrasonic transducers spaced evenly along that segment, with six transducers 1004A-F on one side of that segment and five transducers 1008A-E on the other side. Transducers 1004A-F, 1008A-E provide acoustic emissions of compression and decompression waves that promote cavitation within slurry 222 (FIG. 2) as it flows continuously through duct 900. This action not only cleans binder fines and other surficial matter from the particles in slurry 222, but it also renders unnecessary conventional static residence times and conventional agitators.

In this example, ultrasonic transducers 1004A-F, 1008A-E are each piezoelectric transducers, with transducers 1004A-F being 50 W, 25 kHz transducers and transducers 1008A-E being 50 W, 40 kHz transducers. Thus, entire acoustic cavitation duct 900 made up of the five like segments 900A-E has a total of 55 ultrasonic transducers 1004A-F, 1008A-E, with 30 of the transducers being 50 W, 25 kHz transducers and 25 of the transducers being 50 W, 40 kHz transducers. Transducers 1004A-F, 1008A-E are powered in groups of five by eleven 250 W power supplies 920A-K.

Referring to FIGS. 2 and 9, acoustic cavitation device 224 generally works as follows. When slurry 222 enters inlet 904, fines are bound to the metallic and non-metallic materials that largely form thick converter sludge 214. As slurry 222 is exposed to acoustic cavitation duct 900, the metallic iron particles (see particles 504A of FIG. 5), which are typically spherical in shape, start to vibrate at a frequency that is determined by the ultrasound generated by transducers 1004A-F, 1008A-E (FIG. 10). The frequency at which the metallic iron particles vibrate is different from (higher than) the frequency at which the non-metallic material vibrates, and this promotes the removal of the fines from the metallic iron particles. In the present example, two different ultrasound frequencies are used to produce a uniform sound field of intense ultrasonic cavitation within slurry 222, which maximizes the reaction kinetics within the linear space allotted within acoustic cavitation duct 900. The sound energy produces drastic process rate changes and quality enhancements down to the molecular level.

Those skilled in the art will readily appreciate that acoustic cavitation device 224 shown is merely one example, and that many other configurations are possible. Design considerations for designing a continuous-flow acoustic cavitation device include the composition of the slurry at issue, the flow rate of the slurry, the applied power of the ultrasound, the residence time of the slurry in the acoustic cavitation duct, and the processing rate required, among others. It appears that the power should be greater than 7 W and that the residence time should be at least about 2.5 seconds for most commercial applications. Alternative configurations of the acoustic cavitation device can have passageways that differ in size, transverse cross-sectional shape, length, straightness, etc. Alternative configurations can also have different numbers of transducers and different transducer locations and arrangement. Those skilled in the art will be able to design, make, and use acoustic cavitation devices that provide the desired/necessary cleaning function without undue experimentation.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus, comprising:

a cleaning tool for surface cleaning particles in a slurry in a continuous-flow process, wherein the slurry is flowed through the cleaning tool at a flow rate, said cleaning tool comprising:

an inlet designed and configured to receive the slurry in a continuous flow at the flow rate;

an outlet designed and configured to output the slurry in the continuous flow;

an acoustic cavitation duct extending between said inlet and said outlet so as to carry the slurry in the continuous flow, wherein said acoustic cavitation duct defines a fluid passageway having a flow axis and is designed and configured for inducing acoustic cavitation within the fluid passageway in the continuous flow of the slurry along said flow axis, said acoustic cavitation duct including a plurality of ultrasonic transducers in acoustic communication with said elongate fluid passageway and spaced apart along said flow axis, said plurality of ultrasonic transducers arranged so that acoustic energy from each of the plurality of ultrasonic transducers is applied to the slurry in a direction substantially perpendicular to said flow axis;

at least one first power supply operatively coupled to a first subset of said plurality of ultrasonic transducers and configured to drive said first subset of ultrasonic transducers at a first acoustic-cavitation excitation frequency; and at least one second power supply operatively coupled to a second subset of said plurality of ultrasonic transducers and configured to drive said second subset of ultrasonic transducers at a second acoustic-cavitation excitation frequency different from said first frequency;

wherein said first and second acoustic-cavitation excitation frequencies are set in conjunction with a residence time of the slurry within said acoustic cavitation duct so that acoustic cavitation caused in the slurry by said plurality of ultrasonic transducers surface cleans the particles without damaging the particles.

2. An apparatus according to claim 1, wherein said first acoustic-cavitation excitation frequency is about 25 kHz and said second acoustic-cavitation excitation frequency is about 40 kHz.

3. An apparatus according to claim 1, wherein each of said plurality of ultrasonic transducers operates at a power of greater than 7 watts/liter/minute.

4. An apparatus according to claim 1, wherein said acoustic cavitation duct has a first lateral side and a second lateral side spaced from said first lateral side, wherein:

said first subset of ultrasonic transducers is spaced from one another along said first lateral side; and said second subset of ultrasonic transducers is spaced from one another along said second lateral side.

5. An apparatus according to claim 1, wherein said first and second acoustic-cavitation excitation frequencies differ by about 15 kHz.

6. An apparatus according to claim 4, wherein said first acoustic-cavitation excitation frequency is about 25 kHz and said second acoustic-cavitation excitation frequency is about 40 kHz.

7. An apparatus according to claim 4, wherein said acoustic cavitation duct has a rectangular transverse cross-sectional shape.

8. An apparatus according to claim 7, wherein said rectangular transverse cross-sectional shape has a short dimension and a long dimension that is greater than twice said short dimension, where said first and second lateral sides are spaced apart by said short dimension.

9. An apparatus according to claim 8, wherein said long dimension is about 2.3 times said short dimension.

10. An apparatus according to claim 4, wherein said ultrasonic transducers on said first side of said acoustic cavitation duct are staggered relative to said ultrasonic transducers on said second side of said acoustic cavitation duct.

11. An apparatus according to claim 1, wherein said acoustic cavitation duct has a lower end and an upper end, said inlet being at said lower end and said outlet being at said upper end.

12. An apparatus according to claim 11, wherein said acoustic cavitation duct is substantially vertical when said cleaning tool is installed.

13. An apparatus according to claim 1, wherein said cleaning tool is designed and configured so that the residence time within said fluid passageway is at least 2.5 seconds.

14. An apparatus according to claim 1, wherein said acoustic cavitation duct has at least ten ultrasonic transducers per meter along said flow axis.

15. An apparatus according to claim 14, wherein said at least ten ultrasonic transducers are distributed on multiple sides of said acoustic cavitation duct.

16. An apparatus according to claim 1, wherein the slurry comprises steelmaking converter sludge containing metallic iron microspheres, and said acoustic cavitation duct is designed and configured to clean substantially all contaminants from the metallic iron microspheres.

17. An apparatus according to claim 16, wherein said first acoustic-cavitation excitation frequency is about 25 kHz and said second acoustic-cavitation frequency is about 40 kHz.

* * * * *